(12) United States Patent
Miyazaki et al.

(10) Patent No.: US 12,200,173 B2
(45) Date of Patent: *Jan. 14, 2025

(54) IMAGE PROCESSING DEVICE AND IMAGE PROCESSING METHOD

(71) Applicant: TOSHIBA TEC KABUSHIKI KAISHA, Tokyo (JP)

(72) Inventors: Sou Miyazaki, Sunto Shizuoka (JP); Masaki Narahashi, Tokyo (JP); Satoshi Oyama, Mishima Shizuoka (JP); Haru Hikita, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,751

(22) Filed: Sep. 15, 2023

(65) Prior Publication Data

US 2024/0007568 A1 Jan. 4, 2024

Related U.S. Application Data

(63) Continuation of application No. 17/540,268, filed on Dec. 2, 2021, now Pat. No. 11,800,020.

(30) Foreign Application Priority Data

Feb. 12, 2021 (JP) ................................ 2021-020520

(51) Int. Cl.
*G06K 15/00* (2006.01)
*G06F 3/16* (2006.01)
(Continued)

(52) U.S. Cl.
CPC ......... *H04N 1/00076* (2013.01); *G06F 3/165* (2013.01); *H04N 1/00037* (2013.01);
(Continued)

(58) Field of Classification Search
CPC ........... H04N 1/00076; H04N 1/00037; H04N 1/00042; H04N 1/00045; H04N 2201/0094; G06F 3/165; H04R 1/028
See application file for complete search history.

(56) References Cited

U.S. PATENT DOCUMENTS 6,567,175 B1 5/2003 Lee
10,489,646 B2 11/2019 Mitsuhashi et al.
(Continued)

FOREIGN PATENT DOCUMENTS

JP 2005-131997 5/2005
JP 2008-92358 4/2008
(Continued)

OTHER PUBLICATIONS

Non-Final Office Action for U.S. Appl. No. 17/540,268 mailed Dec. 15, 2022.
(Continued)

*Primary Examiner* — Moustapha Diaby
(74) *Attorney, Agent, or Firm* — Amin, Turocy & Watson, LLP (57) ABSTRACT

There are provided an image processing device and an image processing method capable of efficiently specifying an abnormal sound in case of the occurrence of malfunction that is an important element to clarify the cause of the malfunction. The image processing device includes acquisition means, playing means, changing means, and determination means. The acquisition means acquires a plurality of kinds of sound data indicating sounds different from each other. The playing means plays one kind of sound data from the sound data. The changing means changes the one sound data to another kind of sound data. The determination means determines one kind of sound data from the sound data.

20 Claims, 6 Drawing Sheets

(51) Int. Cl.
*G06K 15/02* (2006.01)
*H04N 1/00* (2006.01)
*H04R 1/02* (2006.01)

(52) U.S. Cl.
CPC ..... *H04N 1/00042* (2013.01); *H04N 1/00045* (2013.01); *H04R 1/028* (2013.01); *H04N 2201/0094* (2013.01)

(56) References Cited

U.S. PATENT DOCUMENTS

| | | |
|---|---|---|
| 2006/0235702 A1 | 10/2006 | Koinuma |
| 2011/0249145 A1 | 10/2011 | Kusaka et al. |
| 2017/0017449 A1* | 1/2017 | Udaka ................ H04N 1/00244 |
| 2017/0061987 A1 | 3/2017 | Kikugawa |
| 2017/0185501 A1 | 6/2017 | Mitsuhashi et al. |
| 2021/0109691 A1 | 4/2021 | Yamakawa |

FOREIGN PATENT DOCUMENTS

| | | |
|---|---|---|
| JP | 2015-160364 | 9/2015 |
| JP | 2018-048885 | 3/2018 |
| JP | 2018-179863 | 11/2018 |
| JP | 2019-153075 | 9/2019 |

OTHER PUBLICATIONS

Extended European Search Report for European Patent Application No. 22153124.7 dated Jun. 22, 2022.
Japanese Office Action for Japanese Patent Application No. 2021-020520 dated Aug. 6, 2024.

* cited by examiner

| N | SOUND SOURCE FILE NAME |
|---|---|
| 1 | 001 |
| 2 | 002 |
| ⋮ | ⋮ |

IMAGE PROCESSING DEVICE AND IMAGE PROCESSING METHOD

CROSS-REFERENCE TO RELATED APPLICATIONS

This application is a Continuation of application Ser. No. 17/540,268 filed on Dec. 2, 2021, the entire contents of which are incorporated herein by reference.

This application is based upon and claims the benefit of priority from Japanese Patent Application No. 2021-020520, filed on Feb. 12, 2021, the entire contents of which are incorporated herein by reference.

FIELD

Embodiments described herein relate generally to an image processing device, an image processing method, and a diagnostic system for the image processing device.

BACKGROUND

When the malfunction occurs in an image processing device such as a digital multi-functional peripheral (MFP), an abnormal sound may be generated. The abnormal sound in case of occurrence of the malfunction is, an important element for the operator who performs the maintenance operation of the corresponding image processing device, to clarify the cause of the malfunction. However, even if the operator asks the user what kind of abnormal sound is heard, it is difficult to specify the abnormal sound only by words. Further, when the abnormal sound is generated only once, the abnormal sound cannot be reproduced. Therefore, there is a demand for a mechanism that can efficiently specify abnormal sound in case of the occurrence of the malfunction.

DETAILED DESCRIPTION

In general, according to one embodiment, there are provided an image processing device and an image processing method capable of efficiently specifying an abnormal sound in case of the occurrence of malfunction that is an important element to clarify the cause of the malfunction.

An image processing device includes acquisition means, playing means, changing means, and determination means. The acquisition means acquires a plurality of kinds of sound data indicating sounds different from each other. The playing means plays one kind of sound data from the sound data. The changing means changes the one sound data to another kind of sound data. The determination means determines one kind of sound data from the sound data.

Hereinafter, an embodiment is described with reference to the drawings.

Figure 1:
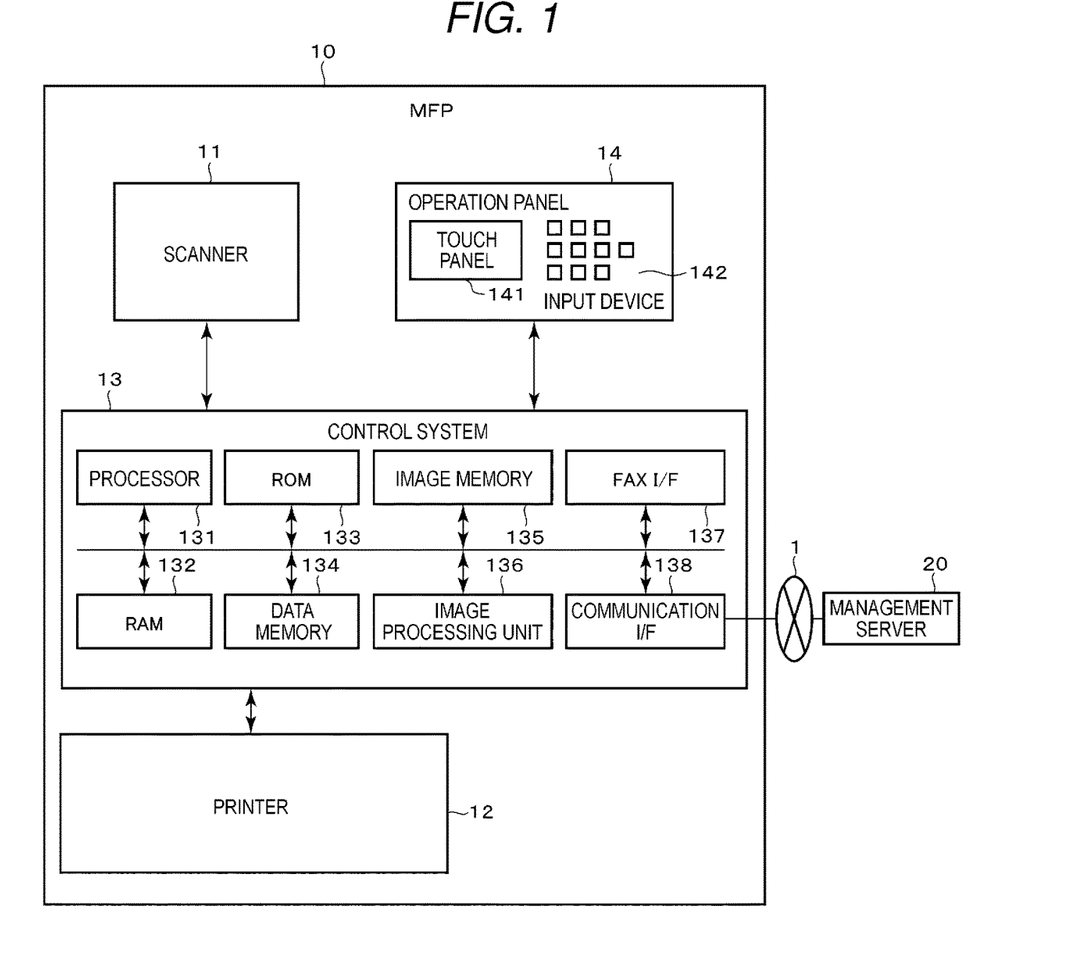
FIG. 1 is a block diagram illustrating a main circuit configuration of an MFP.

FIG. 1 is a block diagram illustrating a schematic configuration of an MFP 10 according to the embodiment. The MFP 10 is an example of the image processing device. The MFP 10 includes a scanner 11, a printer 12, a control system 13, and an operation panel 14. The scanner 11, the printer 12, and the operation panel 14 are connected to the control system 13.

The scanner 11 is a device that optically reads an image of a document according to an operation instruction from the control system 13 and converts the image into image information. The scanner 11 outputs the image information of the read document to the control system 13.

The printer 12 prints an image based on the image information supplied from the control system 13 on paper in various printing conditions designated from the control system 13. As the printer 12, printers of various image forming methods can be applied. For example, the printer 12 may be a printer in an electrophotographic method, and may be a printer in an inkjet method or a thermal transfer method.

The control system 13 collectively controls an operation of each unit such as the scanner 11, the printer 12, and the operation panel 14. In addition, the control system 13 performs various processes such as image processing. The control system 13 includes a processor 131, a random-access memory (RAM) 132, a read-only memory (ROM) 133, a data memory 134, an image memory 135, an image processing unit 136, a facsimile (FAX) interface (I/F) 137, and a communication interface (I/F) 138.

The processor 131 performs various processes such as calculation and control according to programs. The processor 131 is, for example, a central processing unit (CPU). The processor 131 realizes various processing functions by executing programs stored in the ROM 133 or the data memory 134. The RAM 132 is a working memory. The RAM 132 is, for example, a volatile memory. The ROM 133 is a program memory. The ROM 133 is, for example, a non-volatile memory.

The data memory 134 stores control data, a control program, setting information, and the like. The data memory 134 is, for example, a non-volatile memory. The image memory 135 is configured with a hard disk drive, a page memory, and the like. The image memory 135 stores image information. The image processing unit 136 performs image processing with respect to image information.

The FAX interface 137 is an interface for performing FAX communication. The communication interface 138 is a network interface for performing data communication with an external device such as a management server 20 via a network such as Internet 1.

The operation panel 14 is a user interface. The operation panel 14 includes a touch panel 141 and an input device 142. The touch panel 141 is obtained, for example, by stacking a display such as a liquid crystal display or an organic electro-luminescence (EL) display and a sensing device that detects touch input. The input device 142 is, for example, a button, keyboard, a keypad, or a touchpad.

The management server 20 provides a plurality of kinds of sound data respectively indicating different sounds that are required to specify abnormal sounds during a maintenance operation of the MFP 10. The management server 20 provides a playlist and sound source files to the MFP 10 via the Internet 1. The playlist and the sound source files are described below.

Figure 2:
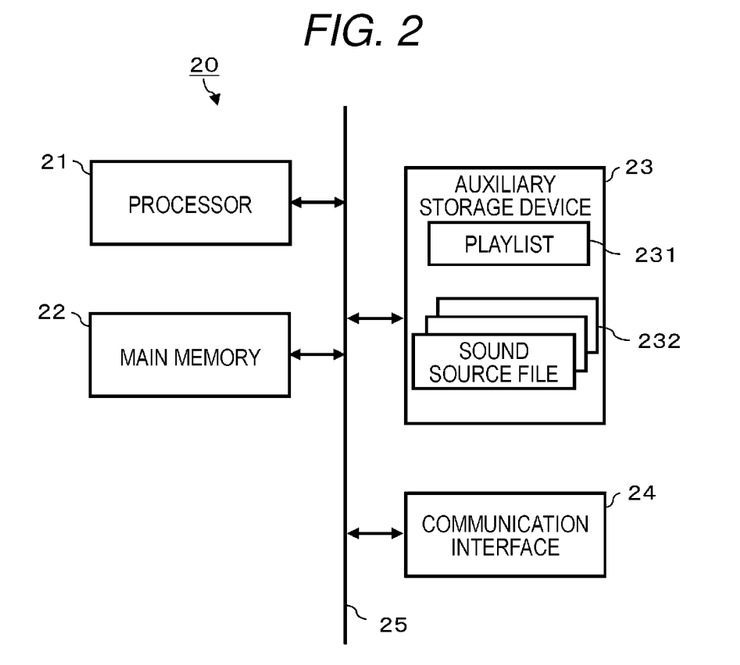
FIG. 2 is a block diagram illustrating a main circuit configuration of a management server.

FIG. 2 is a block diagram illustrating a main circuit configuration of the management server 20. The management server 20 includes, a processor 21, a main memory 22, an auxiliary storage device 23, a communication interface 24, and a system transmission line 25. The system transmission line 25 includes an address bus, a data bus, a control signal line, and the like. The management server 20 connects the processor 21, the main memory 22, the auxiliary storage device 23, and the communication interface 24 to the system transmission line 25. In the management server 20, a computer is configured with the processor 21, the main memory 22, the auxiliary storage device 23, and the system transmission line 25 connecting them.

The processor 21 controls each unit so that various functions as the management server 20 can be realized according to the operating system or the application program. The processor 21 is, for example, a CPU.

The main memory 22 includes a non-volatile memory area and a volatile memory area. The main memory 22 stores an operating system or an application program in a non-volatile memory area. The main memory 22 stores data required for performing processes to control each unit by the processor 21, in a volatile memory area. The data may be stored in the non-volatile memory area. The main memory 22 uses the volatile memory area as a work area where data is appropriately rewritten by the processor 21. The non-volatile memory area is, for example, a ROM. The volatile memory area is, for example, a RAM.

The auxiliary storage device 23 is, for example, an electric erasable programmable read-only memory (EEPROM) (Registered Trademark), a hard disk drive (HDD), or a solid state drive (SSD). The auxiliary storage device 23 stores data used for performing various processes by the processor 21, or data generated by processes in the processor 21, or the like. The auxiliary storage device 23 may store the application program.

The communication interface 24 is an interface circuit for transmitting and receiving data according to a predetermined communication protocol with the MFP 10 connected via the Internet 1.

The management server 20 of the corresponding configuration stores a playlist 231 (see FIG. 3) and a plurality of sound source files 232 in the auxiliary storage device 23. The playlist 231 is a list showing a playback order of the plurality of sound source files 232. The sound source files 232 store sound source records 2321 (see FIG. 4) for each sound source file name.

Figure 3:
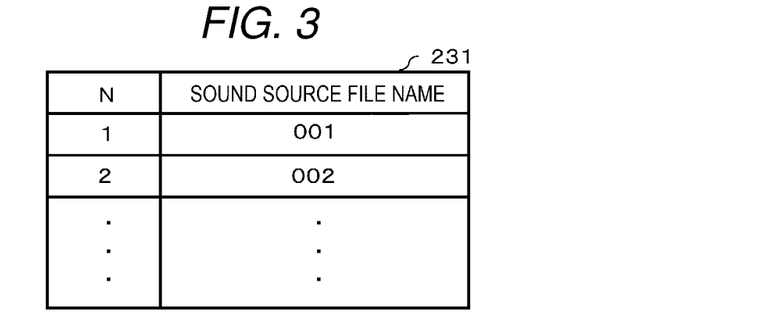
FIG. 3 is a schematic diagram illustrating an example of a playlist.

FIG. 3 is a schematic diagram illustrating an example of the playlist 231. The playlist 231 illustrated in FIG. 3 includes areas for storing pointers N and sound source file names, respectively. The pointers N are unique values allocated for each sound source file 232 in order to identify the sound source files 232. The files are played in an ascending order of the pointers N, that is, in an order from the beginning of the playlist 231. The playback order is prioritized and the files are played in a descending order of the priority. Examples thereof include an order of the sound source files of abnormal sounds with higher generation frequencies in the market relating to the MFP 10, an order of the sound source files with higher risk levels of the sound sources, an order of the sound source files with characteristic sounds, and an order of the sound source files relating to components of the MFP 10 with higher degrees of deterioration. In the present embodiment, the playback order is set in advance by an operator or the like. In addition, the storage destination of the playlist 231 and the sound source files 232 is not limited to the auxiliary storage device 23. The playlist 231 and the sound source files 232 may be stored in the volatile memory area of the main memory 22. The playlist 231 is not limited to the data of the items described above.

Figure 4:
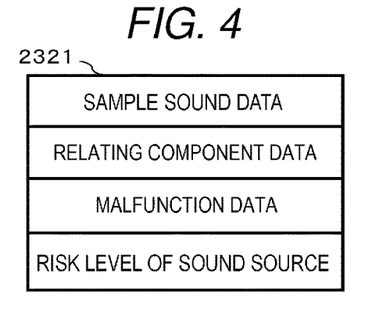
FIG. 4 is a schematic diagram illustrating an example of a data structure of a sound source record stored in a sound source file.

FIG. 4 is a schematic diagram illustrating an example of the data structure of the sound source record 2321 stored in the sound source files 232. The sound source record 2321 illustrated in FIG. 4 includes sample sound data of the abnormal sound, relating component data, malfunction data, and a risk level of the sound source. The relating component data is, for example, information of a configuration component of the MFP 10 expected to be a generation source of the abnormal sound, and the like. The malfunction data is, for example, information in which the abnormal sound is generated, and also white streaks are generated during printing. The risk level of the sound source is a degree of the likeliness of the failure of the MFP 10 as the cause of the abnormal sound. The sound source record 2321 is not limited to the data of the item described above.

Figure 5:
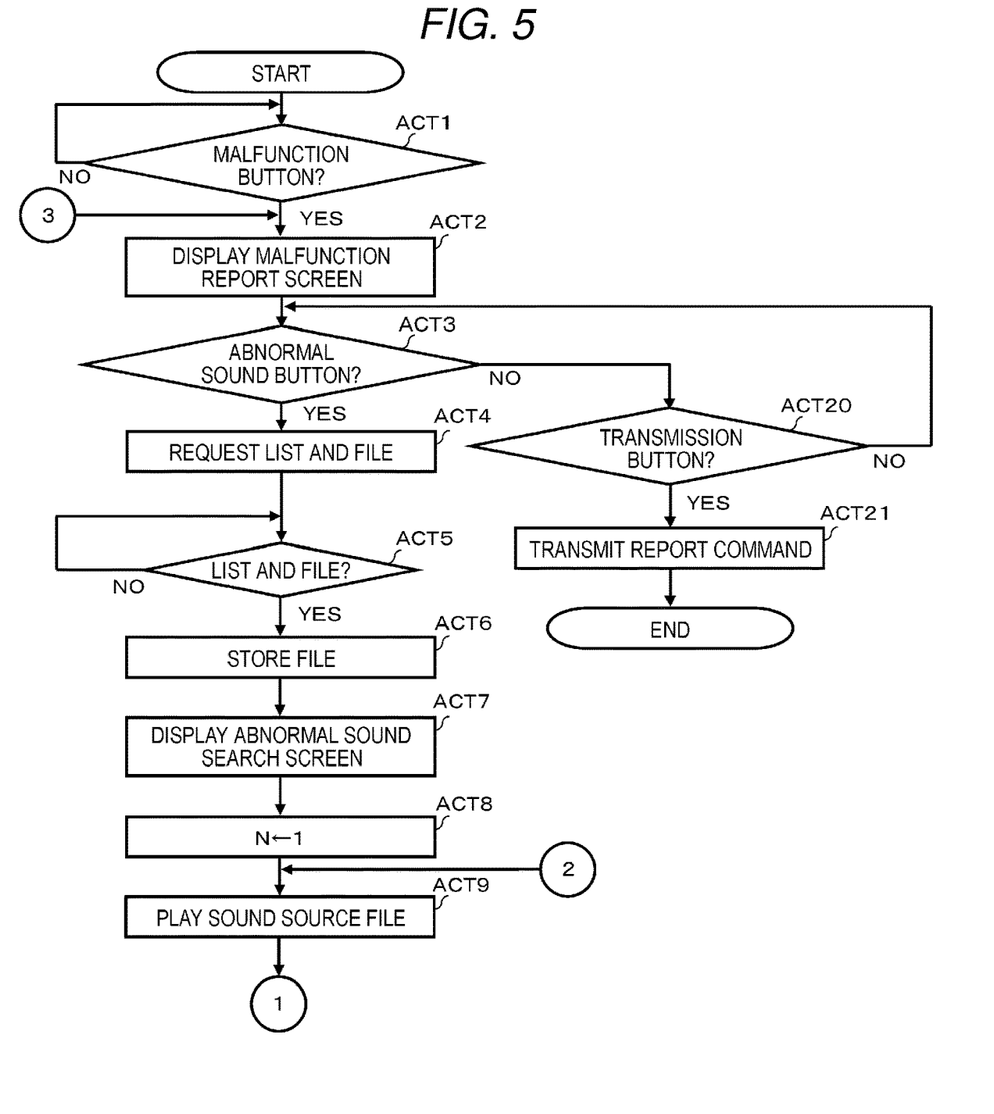
FIG. 5 is a flowchart illustrating a main control procedure of a processor in the MFP.
Figure 6:
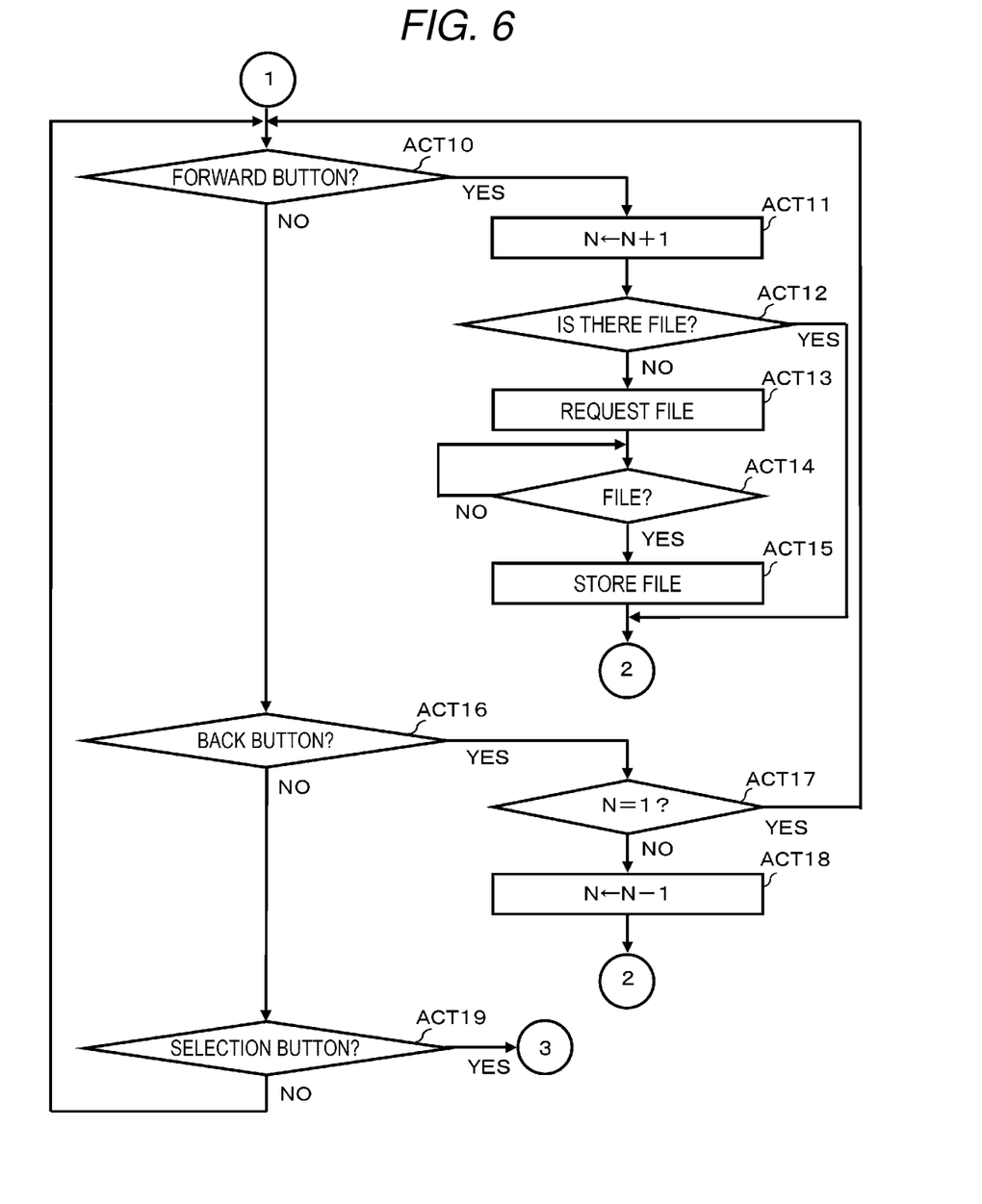
FIG. 6 is a flowchart illustrating the main control procedure of the processor.
Figure 7:
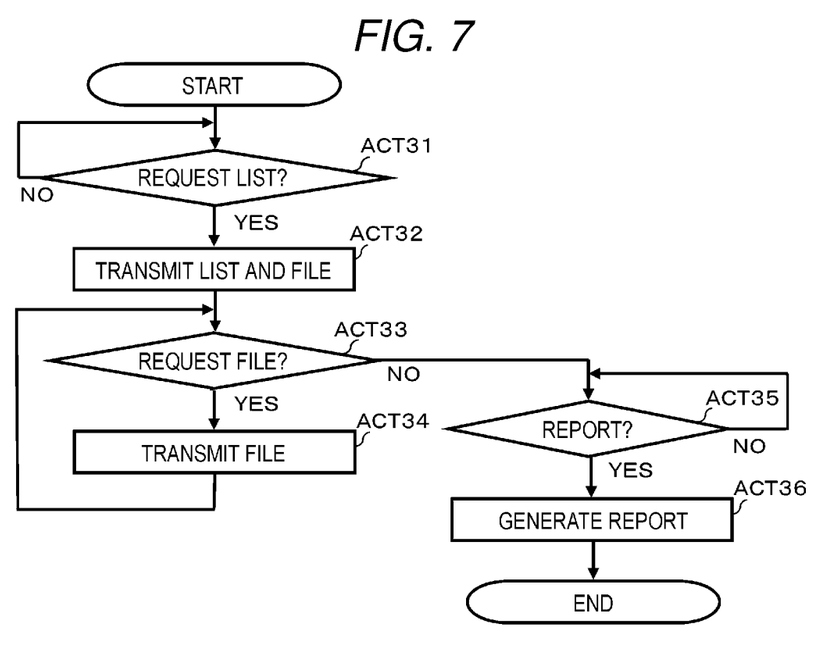
FIG. 7 is a flowchart illustrating the main control procedure of the processor in the management server.

FIGS. 5 and 6 are flowcharts of the procedures of the main information process performed according to the control program by the processor 131 of the MFP 10. FIG. 7 is a flowchart illustrating a procedure of a main information process performed according to the control program by the processor 21 of the management server 20. Hereinafter, the operations of the MFP 10 and the management server 20 are described with reference to these figures. The procedure of the operations and the contents thereof are examples. The procedure and the contents are not limited as long as the same result can be obtained.

During the maintenance operation of the MFP 10, the operator switches the operation mode of the MFP 10 from the normal mode to the malfunction mode. When the operator touches the malfunction button displayed on the touch panel 141, the operation mode is switched to the malfunction mode.

That is, the processor 131 of the MFP 10 waits for the touch on the malfunction button displayed on the touch panel 141 in ACT 1. When the malfunction button is touched, the processor 131 determines YES in ACT 1 and proceeds to ACT 2. The processor 131 displays a malfunction report screen 100 (see FIG. 8) as the malfunction mode on the touch panel 141 in ACT 2.

Figure 8:
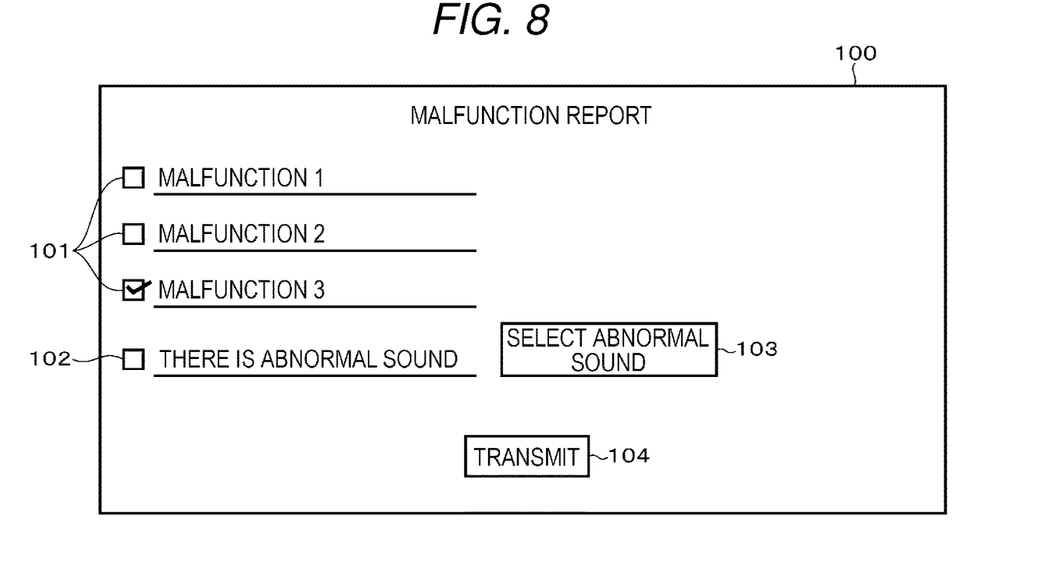
FIG. 8 is a schematic diagram illustrating an example of a malfunction report screen.

FIG. 8 is a schematic diagram illustrating an example of the malfunction report screen 100. As illustrated in FIG. 8, check fields 101 for selecting malfunction, a check field 102 for input when there is an abnormal sound in case of the occurrence of the malfunction, and an abnormal sound button 103 for specifying the sample sound of the abnormal sound are displayed on the malfunction report screen 100. Examples of the malfunction include paper jams and white streaks. A transmission button 104 for instructing transmission confirmation after checks are input to the check field 101, or the check field 101 and the check field 102 is displayed on the malfunction report screen 100. The abnormal sound button 103 may be enabled when a check is input to the check field 102. The displayed content of the text data in FIG. 8 is an example.

The description refers back to FIG. 5. The processor 131 of the MFP 10 confirms whether the abnormal sound button 103 of the malfunction report screen 100 is touched in ACT 3. When the abnormal sound button 103 is touched, the processor 131 determines YES in ACT 3 and proceeds to ACT 4.

The processor 131 controls the communication interface 138 so as to request the playlist 231 and the sound source file 232 at the beginning of the playlist 231 from the management server 20 in ACT 4. According to the control, a list request command is transmitted via the communication interface 138.

The processor 21 of the management server 20 waits for the reception of the list request command from the MFP 10 via the communication interface 138 in ACT 31 of FIG. 7.

When the list request command is received, the processor 21 determines YES in ACT 31 and proceeds to ACT 32. The processor 21 controls the communication interface 24 so as to transmit the playlist 231 and the sound source file 232 at the beginning of the playlist 231 to the MFP 10 in ACT 32. According to this control, the playlist 231 and the sound source file 232 at the beginning of the playlist 231 are transmitted via the communication interface 24.

The description refers back to FIG. 5.

The processor 131 of the MFP 10 that controls the transmission of the list request command in ACT 4 waits for the playlist 231 and the sound source file 232 at the beginning of the playlist 231 from the management server 20 in ACT 5. When the playlist 231 and the sound source file 232 at the beginning of the playlist 231 are received from the management server 20, the processor 131 determines YES in ACT 5 and proceeds to ACT 6.

The processor 131 stores the sound source file 232 in the data memory 134 in ACT 6. The processor 131 displays an abnormal sound search screen 200 (see FIG. 9) on the touch panel 141 in ACT 7.

Figure 9:
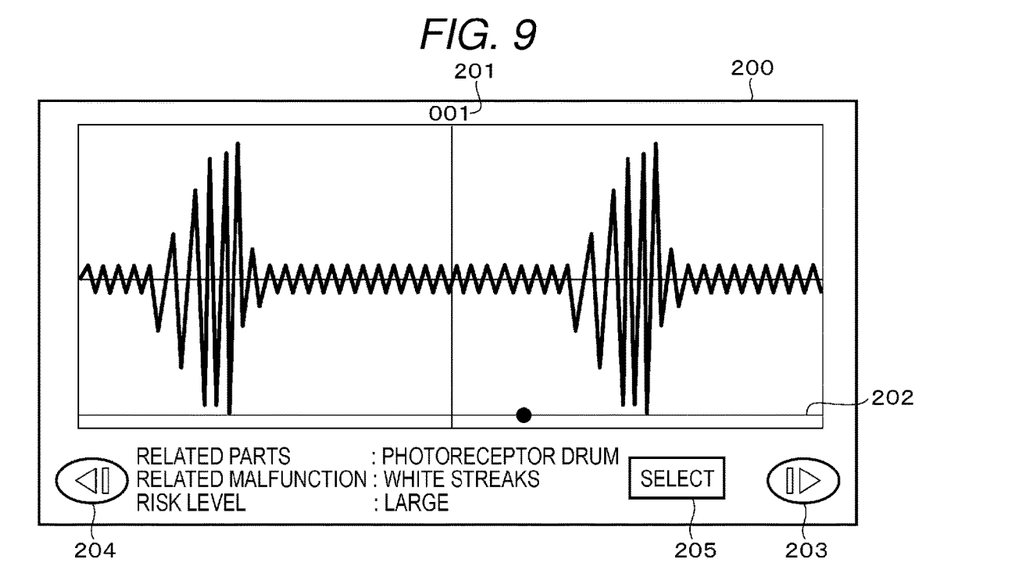
FIG. 9 is a schematic diagram illustrating an example of an abnormal sound search screen.

FIG. 9 is a schematic diagram illustrating an example of the abnormal sound search screen 200. As illustrated in FIG. 9, a seek bar 202 is displayed on the abnormal sound search screen 200 together with a sound source file name 201 and data included in the sound source record 2321. When the seek bar 202 is tapped or dragged by the operator, a sample sound at the selected point is played. An image of a forward button 203, an image of a back button 204, and an image of a selection button 205 are displayed on the abnormal sound search screen 200. When the operator touches the forward button 203, the current sound source file is changed to the sound source file 232 to be played one after. Then, a sample sound of the sound source file 232 is played. When the operator touches the back button 204, the current sound source file is changed to the sound source file 232 played one before. Then, a sample sound of the sound source file 232 is played. The selection button 205 is touched when the sample sound of the sound source file 232 is the same as or close to the abnormal sound that the user has heard. The displayed content of the text data and the image in FIG. 9 are examples.

The description refers back to FIG. 5.

The processor 131 initializes the pointer N of the playlist 231 to "1" in ACT 8. The processor 131 plays the sample sound of the sound source file 232 of which the pointer N is "1" in ACT 9.

The processor 131 confirms whether the forward button 203 is touched in ACT 10 of FIG. 6. When the forward button 203 is touched, the processor 131 determines YES in ACT 10 and proceeds to ACT 11. The processor 131 adds "1" to the pointer N of the playlist 231 in ACT 11.

The processor 131 confirms whether the sound source file 232 corresponding to an addition value "N+1" of the pointer N is stored in the data memory 134 in ACT 12. When the sound source file 232 is stored, the processor 131 determines YES in ACT 12 and returns to ACT 9 of FIG. 5. That is, the processor 131 plays the sample sound of the sound source file 232 corresponding to the addition value "N+1" of the pointer N.

When the sound source file 232 is not stored, the processor 131 determines NO in ACT 12 and proceeds to ACT 13. The processor 131 controls the communication interface 138 so that the sound source file 232 corresponding to the addition value "N+1" of the pointer N is requested from the management server 20 in ACT 13. According to this control, the file request command is transmitted via the communication interface 138. A sound source file name corresponding to the addition value "N+1" of the pointer N is included in the file request command.

The processor 21 of the management server 20 waits for the reception of the file request command from the MFP 10 via the communication interface 138 in ACT 33 of FIG. 7.

When the file request command is received, the processor 21 determines YES in ACT 33 and proceeds to ACT 34. The processor 21 controls the communication interface 24 to transmit the sound source file 232 corresponding to the addition value "N+1" of the pointer N to the MFP 10 in ACT 34. According to this control, the sound source file 232 corresponding to the addition value "N+1" of the pointer N is transmitted via the communication interface 24. Then, the processor 131 returns to ACT 33.

The description refers back to FIG. 6.

The processor 131 of the MFP 10 that controls the transmission of the file request command in ACT 13 waits for the sound source file 232 corresponding to the addition value "N+1" of the pointer N from the management server 20 in ACT 14. When the sound source file 232 is received from the management server 20, the processor 131 determines YES in ACT 14 and proceeds to ACT 15.

The processor 131 stores the sound source file 232 in the data memory 134 in ACT 15. Then, the processor 131 returns to ACT 9 of FIG. 5. That is, the processor 131 plays the sample sound of the sound source file 232 stored in the process of ACT 15.

When the forward button 203 is not touched, the processor 131 determines NO in ACT 10 of FIG. 6 and proceeds to ACT 16. The processor 131 confirms whether the back button 204 is touched in ACT 16.

When the back button 204 is touched, the processor 131 determines YES in ACT 16 and proceeds to ACT 17. The processor 131 confirms whether the pointer N is "1" in ACT 17. When the pointer N is "1", the sound source file 232 one before does not exist. Therefore, the processor 131 determines YES in ACT 17 and returns to ACT 10.

When the pointer N is not "1", the processor 131 determines YES in ACT 17 and proceeds to ACT 18. The processor 131 subtracts "1" from the pointer N of the playlist 231 in ACT 18. Then, the processor 131 returns to ACT 9 of FIG. 5. That is, the processor 131 plays the sample sound of the sound source file 232 corresponding to a subtraction value "N−1" of the pointer N.

When the back button 204 is not touched, the processor 131 determines NO in ACT 16 of FIG. 6 and proceeds to ACT 19. The processor 131 confirms whether the selection button 205 is touched in ACT 19. When the selection button 205 is not touched, the processor 131 determines NO in ACT 19 and returns to ACT 10.

When the selection button 205 is touched, the processor 131 determines YES in ACT 19 and returns to ACT 2 of FIG. 5. The processor 131 performs the processes of ACTS 2 and 3 described above.

Here, when the abnormal sound button 103 of the malfunction report screen 100 is not touched, the processor 131 determines NO in ACT 3 and proceeds to ACT 20. The processor 131 confirms whether the transmission button 104 is touched in ACT 20.

When the transmission button 104 is touched, the processor 131 determines YES in ACT 20 and proceeds to ACT 21. The processor 131 controls the communication interface 138 so that the report command is transmitted to the management server 20 in ACT 21. According to this control, the report command is transmitted via the communication interface 138. The sound source file name of the sound source file 232 when the selection button 205 is touched and the information relating to the MFP 10 in which the malfunction occurs are included in the report command. The information relating to the MFP 10 in which the malfunction occurs includes, for example, the name and the model number of the corresponding MFP 10 and the date and time when the malfunction occurs. With the above, the processor 131 ends the information processes of the procedures illustrated in the flowcharts of FIGS. 5 and 6.

The processor 21 of the management server 20 waits for the reception of the report command from the MFP 10 via the communication interface 138 in ACT 35 of FIG. 7.

When the report command is received, the processor 21 determines YES in ACT 35 and proceeds to ACT 36. The processor 21 generates a malfunction report based on the sound source file name and the information relating to the MFP 10 in which the malfunction occurs included in the report command in ACT 36. A link to the corresponding sound source file 232 is included in the malfunction report. With the above, the processor 21 ends the information process of the procedure illustrated in the flowchart of FIG. 7.

As clearly described above, the MFP 10 that is an example of the image processing device configures acquisition means by performing processes of ACTS 1 to 6 of FIG. 5. That is, the MFP acquires a plurality of kinds of sound data indicating sounds different from each other.

The processor 131 of the MFP 10 configures playing means by performing the process of ACT 9 of FIG. 5. That is, the MFP plays one kind of sound data from the sound data.

The processor 131 of the MFP 10 configures changing means by performing the processes of ACTS 10 to 18 of FIG. 6. That is, the MFP 10 changes another kind of sound data from the one kind of sound data.

The processor 131 of the MFP 10 configures determination means by performing the process of ACT 19 of FIG. 6. That is, the MFP 10 determines one kind of sound data from the sound data.

According to the present embodiment, when the operator touches the malfunction button displayed on the touch panel 141 of the MFP 10, the malfunction report screen 100 is displayed as the malfunction mode. Further, when the abnormal sound button 103 of the malfunction report screen 100 is touched, the abnormal sound search screen 200 is displayed, and the sample sound of the sound source file 232 is played. When the forward button 203 is touched, the current sound source file is changed to the sound source file 232 to be played one after, and the sample sound thereof is played. When the back button 204 is touched, the current sound source file is changed to the sound source file 232 played one before, and the sample sound thereof is played. When the sample sound of the sound source file 232 is the same as or close to the abnormal sound that the user has heard, the selection button 205 is touched. Therefore, the operator can specify the abnormal sound in case of the occurrence of the malfunction with a simple operation.

The processor 131 of the MFP 10 configures output means by performing the process of ACT 21 of FIG. 5. That is, the MFP outputs one kind of data determined by the determination means and the information relating to the image processing device in which the malfunction occurs, that is, the MFP 10. Therefore, the operator does not have to generate a malfunction report of the MFP 10 and no effort and time are required.

The sound source files 232 are prioritized in the playlist 231, and the sample sounds of the sound source files 232 are played in a descending order of the priority. Therefore, the operator can efficiently specify the sound source file 232 that is the same as or close to the abnormal sound at an early stage.

In the above embodiment, the image processing device and the image processing method are described. However, the embodiments are not limited thereto.

In the above embodiments, a case where the image processing device is the MFP 10 is exemplified. The image processing device is not limited to the MFP 10. For example, the image processing device may be a copying machine or a printer.

In the above embodiments, the playback order is described to be set in advance by the operator or the like. In addition, for example, when the user plays one sound source file 232 for a long period of time, the sound source file subsequently played may be set as the sound source file 232 of the sound that is close to the sound played for a long period of time. That is, the playlist 231 may be dynamically generated based on the operation of the operator. The playlist 231 may be common in all the MFPs or may be different for each MFP 10.

In the above embodiment, the case where one sound source file 232 that is the same as or close to the abnormal sound heard by the user is selected is exemplified. For example, the operator may select the plurality of sound source files 232. In this case, sound source file names of the plurality of sound source files 232 are included in the report command.

While certain embodiments have been described, the embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. These embodiments and modifications fall within the scope and spirit of the disclosure and fall within the invention described in the claims and their equivalents.

What is claimed is:

1. An image processing device, comprising:
  a processor; and
  a memory that stores executable instructions that, when executed by the processor, facilitate performance of operations, comprising:
    acquiring a plurality of kinds of sound data indicating sounds different from each other;
    playing one kind of sound data from the sound data in a descending order of abnormal sounds with higher generation frequencies;
    changing the one kind of sound data to another kind of sound data; and
    determining a specific kind of sound data from the plurality of kinds of sound data, the specific kind of sound data relating to the image processing device in which a malfunction occurs; and outputting the specific kind of sound data, information relating to the image processing device, and a time of the malfunction.

2. The image processing device according to claim 1, further comprising:

prioritizing playback order by playing in a descending order of priority.

3. The image processing device according to claim 1, further comprising:

outputting the one kind of sound data determined and information relating to the image processing device in which a malfunction occurs.

4. The image processing device according to claim 1, wherein each of the sound data has a priority, and further comprising:

playing one kind of sound data from the sound data in a descending order of the priorities.

5. The image processing device according to claim 1, wherein the sound data comprises different sounds, each sound associated with a specific abnormality.

6. An image processing method, comprising:

acquiring a plurality of kinds of sound data indicating sounds different from each other;

playing one kind of sound data from the sound data in a descending order of abnormal sounds with higher generation frequencies;

changing the one kind of sound data to another kind of sound data; and determining a specific kind of sound data from the plurality of kinds of sound data, the specific kind of sound data relating to an image processing device in which a malfunction occurs; and outputting the specific kind of sound data, information relating to the image processing device, and a time of the malfunction.

7. The image processing method according to claim 6, further comprising:

prioritizing playback order by playing in a descending order of priority.

8. The image processing method according to claim 6, further comprising:

outputting the one kind of sound data determined and information relating to the image processing device in which a malfunction occurs.

9. The image processing method according to claim 6, wherein each of the sound data has a priority, and further comprising:

playing one kind of sound data from the sound data in a descending order of the priorities.

10. The image processing method according to claim 6, wherein the sound data comprises different sounds, each sound associated with a specific abnormality.

11. An image processing device, comprising:

a processor; and a memory that stores executable instructions that, when executed by the processor, facilitate performance of operations, comprising:

acquiring a plurality of kinds of sound data indicating sounds different from each other;

playing one kind of sound data from the sound data in a descending order of higher risk levels of the sound sources;

changing the one kind of sound data to another kind of sound data; and determining a specific kind of sound data from the plurality of kinds of sound data, the specific kind of sound data relating to the image processing device in which a malfunction occurs; and outputting the specific kind of sound data, information relating to the image processing device, and a time of the malfunction.

12. The image processing device according to claim 11, further comprising:

prioritizing playback order by playing in a descending order of priority.

13. The image processing device according to claim 11, further comprising:

outputting the one kind of sound data determined and information relating to the image processing device in which a malfunction occurs.

14. The image processing device according to claim 11, wherein each of the sound data has a priority, and further comprising:

playing one kind of sound data from the sound data in a descending order of the priorities.

15. The image processing device according to claim 11, wherein the sound data comprises different sounds, each sound associated with a specific abnormality.

16. An image processing method, comprising:

acquiring a plurality of kinds of sound data indicating sounds different from each other;

playing one kind of sound data from the sound data in a descending order of higher risk levels of the sound sources;

changing the one kind of sound data to another kind of sound data; and determining a specific kind of sound data from the plurality of kinds of sound data, the specific kind of sound data relating to an image processing device in which a malfunction occurs; and outputting the specific kind of sound data, information relating to the image processing device, and a time of the malfunction.

17. The image processing method according to claim 16, further comprising:

prioritizing playback order by playing in a descending order of priority.

18. The image processing method according to claim 16, further comprising:

outputting the one kind of sound data determined and information relating to the image processing device in which a malfunction occurs.

19. The image processing method according to claim 16, wherein each of the sound data has a priority, and further comprising:

playing one kind of sound data from the sound data in a descending order of the priorities.

20. The image processing method according to claim 16, wherein the sound data comprises different sounds, each sound associated with a specific abnormality.

\* \* \* \* \*